United States Patent [19]

Tseng

[11] Patent Number: 5,416,279
[45] Date of Patent: May 16, 1995

[54] RECEPTACLE WEIGHT INDICATOR

[76] Inventor: Ling-Yuan Tseng, 13772 Calle Tacuba, Saratoga, Calif. 95070

[21] Appl. No.: 71,192

[22] Filed: Jun. 2, 1993

[51] Int. Cl.$^6$ .................. G01G 19/52; G01G 3/00; G01L 5/00
[52] U.S. Cl. .................. 177/132; 177/225; 177/264; 73/862.391; 116/DIG. 32
[58] Field of Search .............. 177/132, 160, 225, 264; 73/862.391, 862.392, 862.471, 862.621; 116/DIG. 32

[56] References Cited

U.S. PATENT DOCUMENTS

| | | | |
|---|---|---|---|
| 3,372,581 | 3/1968 | Tell | 73/862.391 |
| 5,016,479 | 5/1991 | Taback | 73/862.391 |
| 5,319,162 | 6/1994 | Ness | 177/231 |

FOREIGN PATENT DOCUMENTS

| | | | |
|---|---|---|---|
| 0371818 | 11/1921 | Germany | 177/132 |
| 2721518 | 11/1978 | Germany | 177/225 |

*Primary Examiner*—George H. Miller, Jr.
*Attorney, Agent, or Firm*—Krass & Young

[57] ABSTRACT

Force-releasable elements are used in association with imprinted numerical values of weight to provide a visual indication of the weight of the contents of a receptacle. The system is extremely easy to manufacture and highly affordable, thus enabling it to be used with disposable items such as trash bags. In one embodiment, the numerical weight values are arranged as bands about the girth of the bag, with the imprinted material being gathered in and covered with a force-releasable strip of material. Each imprinted band and its accompanying force-releasable element are associated with a different value of weight, so that when the receptacle is lifted, a user may ascertain an approximate value of the weight of the contents by referring to the indicia associated with released and un-released elements. In alternative embodiments, the force-releasable elements and indicia being positioned along a cord of a strap which may be tied onto the receptacle or provided with it.

21 Claims, 4 Drawing Sheets

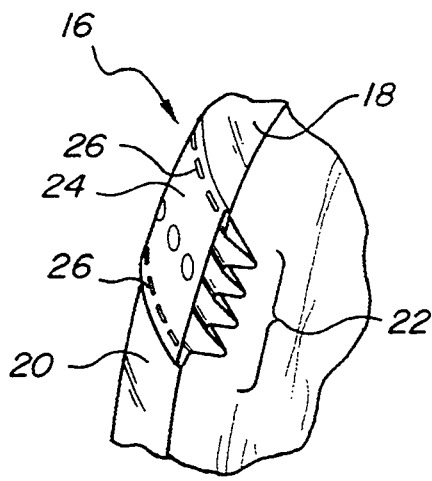
*FIG-1A*
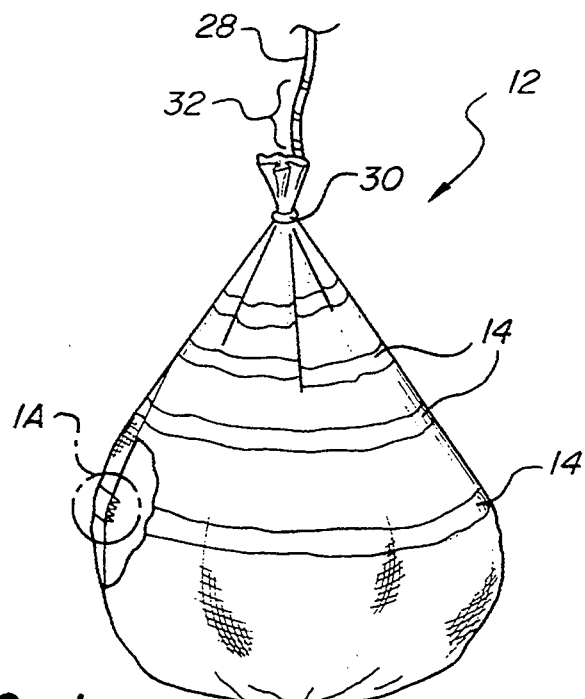
*FIG-1*
*FIG-2A*
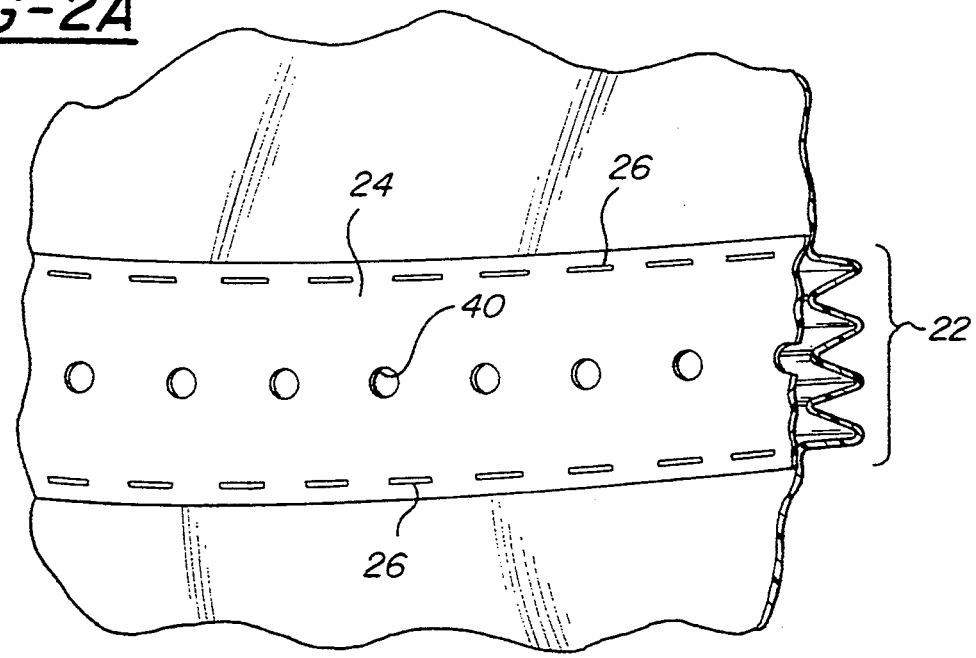

RECEPTACLE WEIGHT INDICATOR

FIELD OF THE INVENTION

The present invention relates generally to weighing apparatus and, in particular, to a receptacle such as the type that may be used for trash hauling which incorporates force-releasable elements which indicate the weight of the contents of the receptacle when it is lifted.

BACKGROUND OF THE INVENTION

With increasing population and the consumption of land suitable for land-fill sites, garbage collection and distribution has become a serious global problem. At the same time, concern for the environment has prompted widescale recycling and regulations to control disposal practices, such as unchecked offshore dumping. All of these concerns are causing trash pick-up and waste management to be a much more sophisticated process than it once was, requiring much more control over what is being discarded and where it is being put.

To ensure that household refuse is disposed of properly, additional personnel are required and, in many cases, the refuse must be hauled greater and greater distances as land-fills are consumed. This means that trash collection has become, and will continue to become, increasingly expensive. One technique used to allocate the expenses associated with rubbish removal is to collect these materials on the basis of weight, and to charge customers accordingly.

Clearly trash must be weighed when it is first collected since it loses its identifiable nature when commingled. Of course, various scales are available which may be used in conjunction with curbside collection, but sophisticated electronic, and even mechanical scales prevent difficulties, both in terms of affordability and in terms of maintenance. Additionally, at least for the time being, extremely precise weight measurements are not required and approximations, for example to the nearest five pounds, may be sufficient. As such, complex scales are not yet required.

Thus, there remains a need for an economical but sufficiently accurate means of weighing receptacles, such as the plastic bags ordinarily employed for trash collection purposes. An ideal device would be sufficiently accurate but passive in the sense that intricate mechanical mechanisms or electronic sensors are not required. With a sufficiently economical device, the burden of procuring the scale could be shifted to the garbage source as opposed to the garbage collector, thereby relieving an already challenged system of yet another requirement which may need to be implemented on a wide scale.

SUMMARY OF THE INVENTION

The present invention forgoes the need for a sophisticated mechanical or electronic scale by providing a receptacle which has a built-in weight indicator. In all embodiments, when the receptacle is lifted, one or more force-responsive elements are released due to the weight of the receptacle and its contents. Then by referring to numerical indicia associated proximate to each element, the individual lifting the receptacle is provided with an immediate approximation of the weight of the contents.

In the preferred embodiment, a bag is provided with the elements and weight-related indicia imprinted as spaced-apart bands, each of which encircles at least a portion of the girth of the bag. The material of the bag immediately above and below each imprinted band is locally gathered and attached to keep it in place until the receptacle is lifted, at which point if the weight is equal to or in excess of a value given by one of the numerical imprints the element associated with that imprint is released. The weight value may be imprinted on the gathered material on the releasable element.

Depending upon manufacturing technique, the material of the receptacle may be pulled over the imprinted bands and attached to itself so as to come apart without the need for an additional breakable member. However, to provide improved accuracy, a separate piece of force-releasable material in the form of a band or tape is added with perforations or thickness or material variation to ensure that it releases at a particular weight. Each band about the receptacle is preferably associated with a different weight, with the bands being arranged in order of increasing numerical weight values, with the value associated with the lowest weight being closest to the bottom of the receptacle. However, since the release of the material around a particular imprinted band serves only to indicate a value of weight and does not cause any appreciable tear or opening in the bag material upon release, the bands may be arranged with any spacing and in any order, for example, the bands may all be closely spaced near the top of the receptacle.

A method is described for manufacturing a receptacle having an indicator in the form of spaced-apart bands, whereby a sheet of flexible material is pulled over a cylindrical form having sections with gaps between the sections. A vacuum generated within the form pulls the band of imprinted, flexible material, into the gap, allowing a strip of force-releasable material to be overlaid and attached upon each band thus gathered.

In an alternative embodiment, the bands are not on the receptacle but on a strap adapted for use with the receptacle. In this embodiment, the strap has two ends, one of which is attached to the receptacle or used to tie the receptacle, while the other end is grasped for lifting. The releasable elements in this case are located along this primary strap, and a shock retaining member is preferably, attached at points along the primary strap between the releasable elements, with loops which allow the elements to release while keeping the broken halves connected to ensure that the receptacle doesn't fall to the ground. In a further alternative embodiment, the strap takes the form of a cord which is pinched and inserted into releasable force rings located along its length.

BRIEF DESCRIPTION OF THE DRAWINGS

FIG. 1 is a drawing of a bag having imprinted bands, each being covered with a piece of force-releasable material;

FIG. 1A is an insert drawing of a close-up cross section of one of the imprinted bands;

FIG. 2A is a front view of the force-releasable material which uses perforations as a means to pull it apart;

DETAILED DESCRIPTION OF THE PREFERRED EMBODIMENT

Figure 2B:
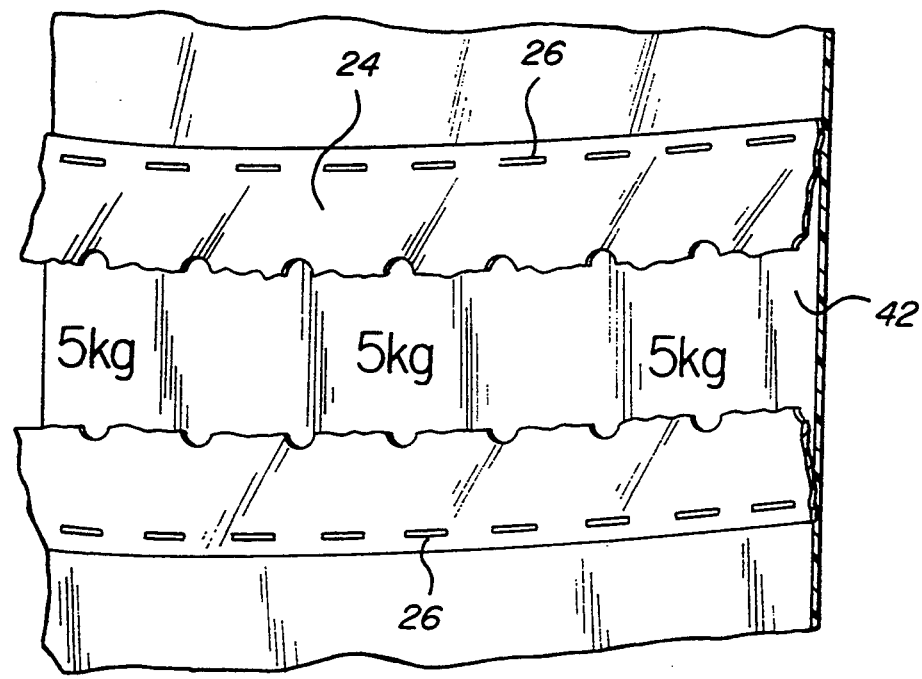
FIG. 2B is a drawing of the material in FIG. 2A, having been pulled apart to expose weight-related indicia previously hidden.

Turning to the figures, FIG. 1 shows a receptacle in form of a trash bag composed of flexible sheet material, the bag being indicated generally at 12. Around the girth of the bag is a plurality of spaced-apart bands 14 a close-up cross section of one of the bands, being further illustrated in the inset drawing 16 (FIG. 1A). Referring to FIG. 1A, receptacle material 18 immediately above the band and receptacle material 20 immediately below the band are pulled toward one another, causing the material comprising the band itself to become gathered and to take on a convoluted appearance as indicated at 22. This folded material contains a weight-related imprint value, obscured in FIG. 1, but which is further detailed in subsequent drawings. Once material section 18 and material section 20 are drawn close to one another, a band of force-release material 24 is adhered over folded material 22 and attached along broken lines 26. The force-release material 24, which may be in the form of a continuous band or discrete tapes, is engineered so as to tear when a tensile force of sufficient magnitude is imposed on the band as by lifting the bag. Details concerning the force-release structure are also presented in subsequent drawings.

The technique used to adhere the force-release material over the indicia-imprinted band can be of several types, including the use of an adhesive, stitching, thermal or ultrasonic welding, or any combination. It is only necessary that the attachment of the force-release element to the receptacle material maintain its integrity should the force-release material pull apart to indicate the weight of the contents of the receptacle. Numerous techniques may also be used to adjust the release point of the elements, including material thickness, cross-sectional structure, and composition. For example, PVC may be used in combination with polypropylene and/or polyethylene so as to vary tensile strength.

It may be possible through controlled manufacturing to eliminate the need for separate force-releasable strip, such as that shown in FIG. 1. In this case, the receptacle material immediately above the imprinted band would be adhered directly to the receptacle material immediately below the imprinted band though at least two problems might arise with this approach. First, as the force required to release each band is preset to a different value associated with each band, it is probably easier to meet accuracy control standards with a separate piece of force-release material. Additionally, it is an important aspect of this invention that although material is released to provide a visual indication of weight, the integrity of the receptacle itself remains unimpaired. In other words, no holes or tears are introduced in the material of the receptacle when it is lifted and its weight is gauged. Although the material above and below the imprinted band may be adhered to itself as an integral force-release element, it may be more difficult to ensure that holes and tears do not occur as compared with the use of a separate force-release element.

FIG. 1 also shows the use of a strap 28 which is tied to the receptacle in the vicinity of 30, and which has force-releasable elements and weight-related indicia along its length at 32. This strap, which may be used by itself or in combination with the receptacle just described, will be characterized in detail with reference to FIGS. 3 and 4.

FIG. 2A is a front view of a force-releasable band before breaking, and FIG. 2B shows that band after breaking due to lifting of the receptacle to which the band is attached, the weight of the contents of the receptacle being equal to or in excess of 5 kilograms. Referring to FIG. 2A, the band of force-releasable material 24 is adhered to the material of the receptacle immediately above the band (18) along broken line 26 and to the receptacle material below the band (20) along a second broken line 26. With band 24 intact, the area of imprinted weight value 22 remains folded and hidden from view. However, should the receptacle be filled with contents weighing 5 kilograms or more, and should the receptacle be lifted from its top, the resulting tensile force will cause band 24 to pull apart, in this case along a line of perforations 40, thus exposing the weight-related indicia 42 previously hidden on material section 22. The band of force-releasable material will now be split into an upper and a lower half, but with attachments along lines 26 being stronger than the material in the vicinity of the perforations, the indicia are exposed without compromising the material of the receptacle itself. Alternatively, the indicia may be imprinted on the releasable element whether in the form of a band or tapes, in which case the weight value may be gleaned by reading the indicators remaining intact.

Figure 3:
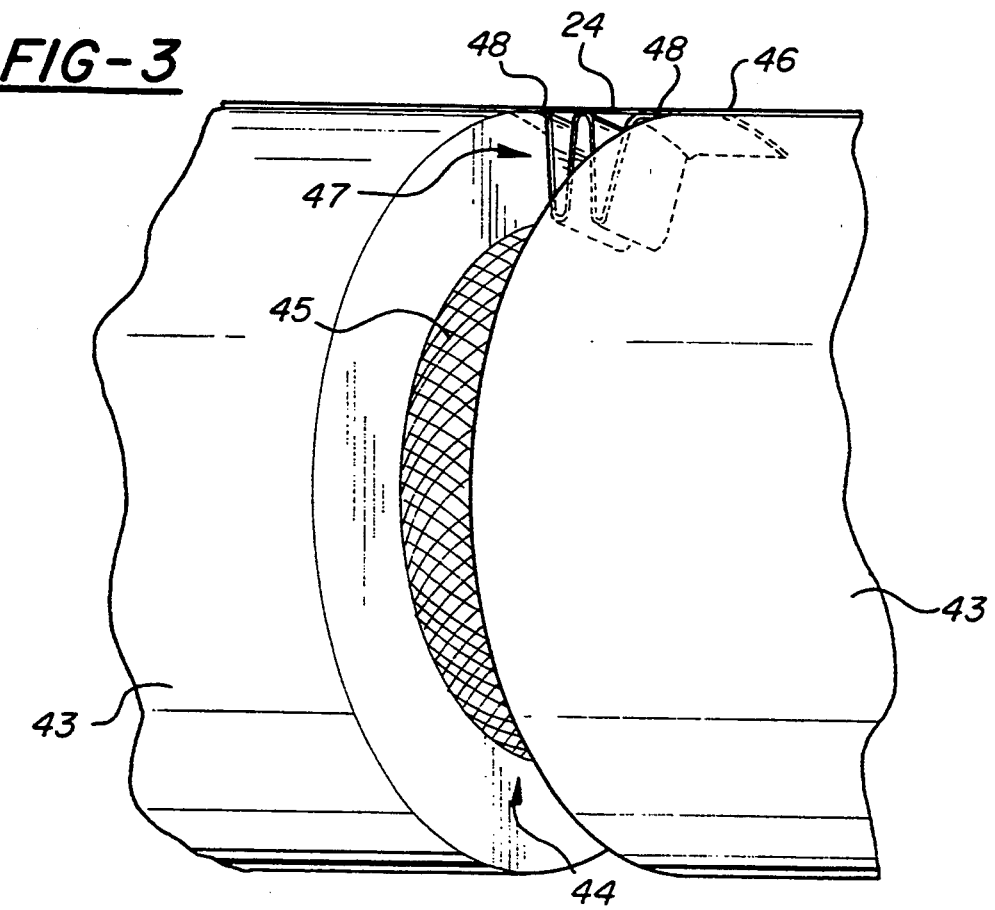
FIG. 3 shows a method of gathering in an imprinted band so as to cover it with a strip of releasable material.

In FIG. 3 there is shown an apparatus which may be used to facilitate a method of manufacturing receptacles in the form of bags having weight-indicating bands of the type herein described. A form, preferably having a cylindrical cross section, is formed in longitudinal sections 43, a gap 44 being present between these sections, an inner element 45, preferably of cylindrical cross section as well, is composed of a mesh or other permeable material allowing a vacuum generated within the form to extend into the gap area. FIG. 3 shows one gap which may be used for all of the force-releasable bands, as the force required to release the band is set only by the release element. Alternatively, however, to speed production, a form with a plurality of bands, each being associated with one of the gaps, may be utilized. Continuing the reference to FIG. 3, the sheet bag material 46 is pulled over forms 43, the material in this case being shown in cross section. With a vacuum generated within the forms, material in the vicinity of the gap is pulled into the gap by the vacuum but stopped by mesh liner 45, resulting in a series of gathers depicted generally at 47. Once material movement is stabilized, the strip of force-releasable material 24 may be placed over the gathered material 47, which contains imprinted weight-related indicia, and tacked in place along lines indicated by points 48. Again, any means of attaching the force-release strip may be used, including cementation, stitching, thermal or ultra-sonic welding, including spot welding.

Figure 4A:
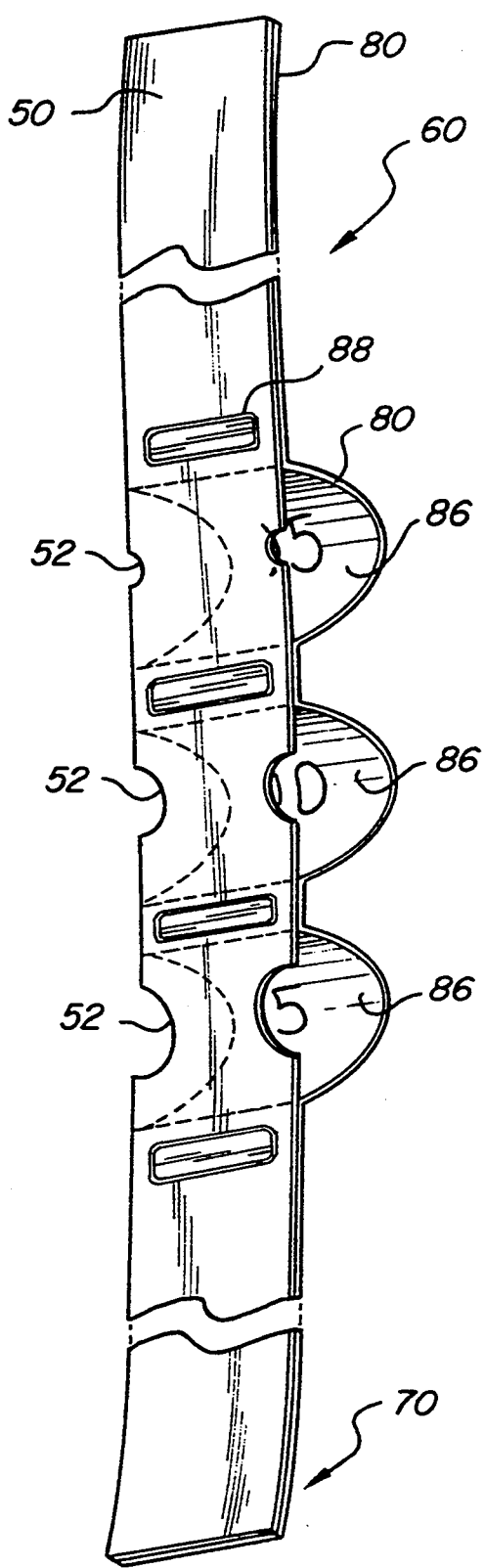
FIG. 4A is an oblique drawing of a strap formed in accordance with the present invention wherein notches are used as a force-release mechanism.
Figure 4B:
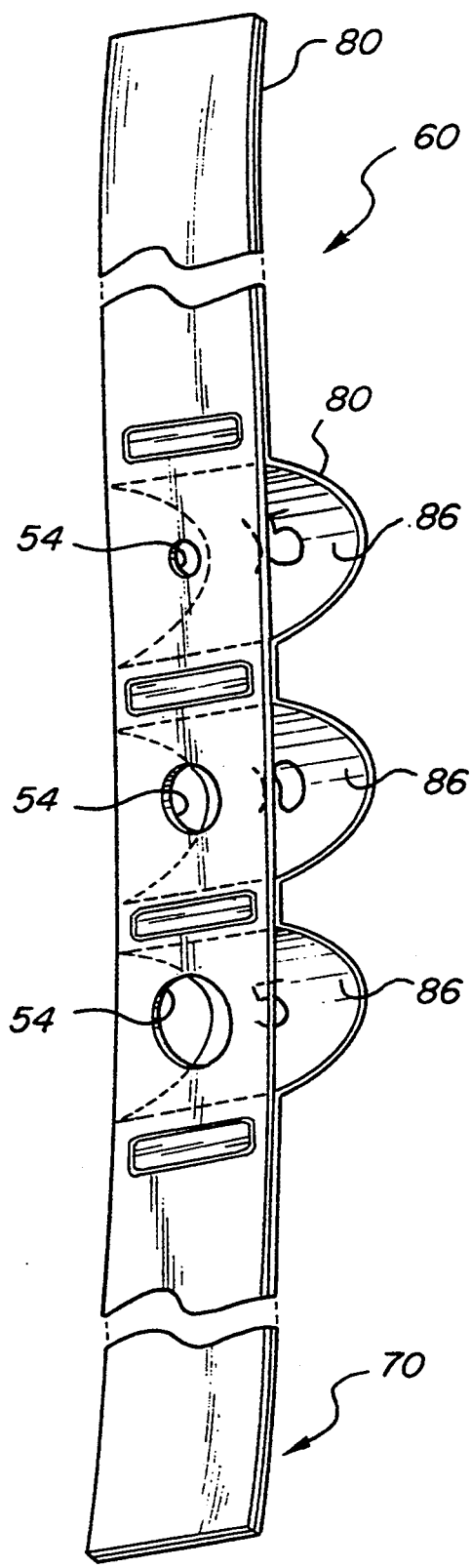
FIG. 4B is an oblique drawing of a strap alternatively using perforations instead of notches as a force-release mechanism.

Turning now to FIG. 4, FIG. 4A shows an alternative embodiment of the present invention in the form of a strap 50 which utilizes notches 52, the notches being of different dimensions to allow breakage at different points along the strap. FIG. 4B shows an alternative use of apertures 54 used in place of notches, the size of the aperture in this case being related to the force-required to break the strap at a particular section. In both cases shown, the straps have an upper section 60 intended to be grasped and lifted by a user, and a lower section 70 which is attached to the upper portion of the receptacle, either by tying or by providing a receptacle with the strap already attached. Both structures depicted in FIG. 4 also incorporate the use of a shock retaining member 80 upon which weight-related indicia 86 have been imprinted. The imprinted shock retaining member is adhered to the primary breakable strap at various points 88 using various means, including cementation, weldment, and so forth.

It is possible to provide a strap in accordance with the present invention as shown in FIG. 4, but without the shock retaining member, by providing a longer strap with the force-releasable sections being arranged in order of increasing breaking value, with the lowest breaking value being positioned closest to the top of the strap, and with ample length provided between each breakable element for subsequent grasping. With this configuration, a user would first lift the receptacle with the strap at its highest point and, should the strap break the user would lift the bag again by the strap remaining, and continue this until the strap no longer breaks, at which time it would be known that the weight of the contents of the receptacle must weigh less than the imprinted value associated with the next breakable element. In this case, the weight related indicia would be imprinted on the single strap in the vicinity of the force-releasable area.

Although such a single-strap weight indicator could be produced in accordance with this invention, the necessity to repeatedly grab and lift by the end of the strap created upon breakage, does not warrant the elimination of shock retainment member 80, which may be economically manufactured and adhered to the primary breakable strap.

Figure 5:
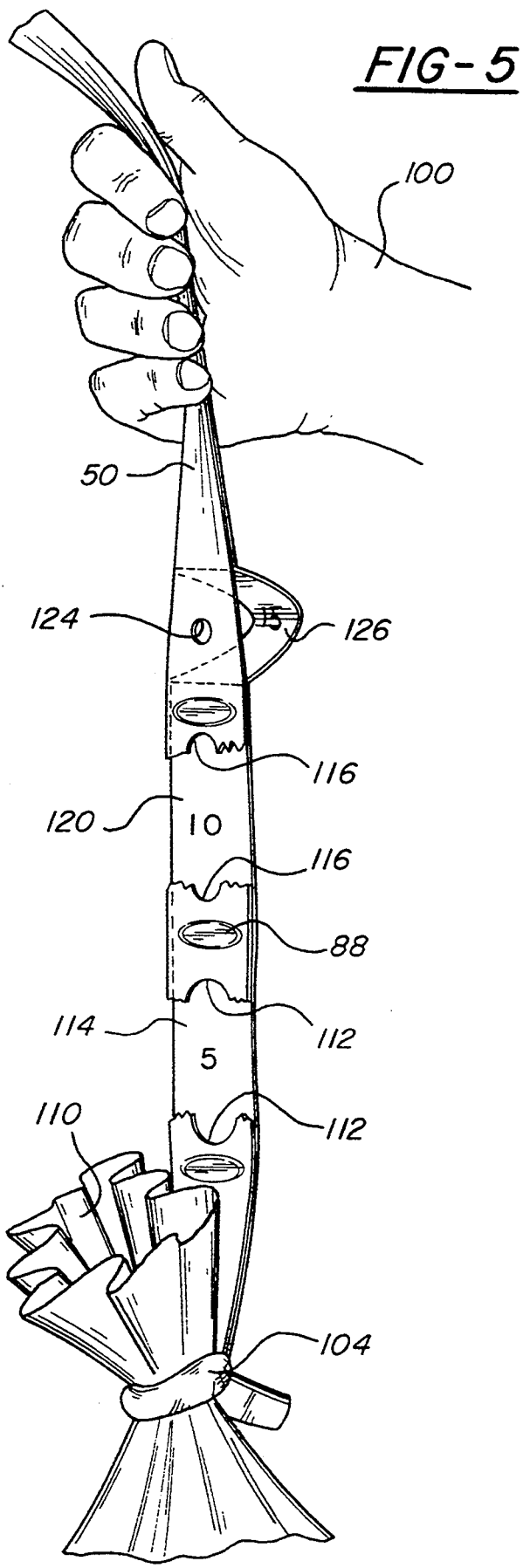
FIG. 5 is a drawing of the strap depicted in FIG. 3B, now in use, wherein two of its elements have been pulled apart to expose previously obscured weight-related indicia.

FIG. 5 shows how a strap with force-releasable elements in the form of central perforations is typically put to use. A user 100 grabs the strap 50 along its upper section, the lower section of the strap being tied at 104 to a receptacle in the form of a bag depicted by 110. Assuming, in this case, that the weight-related indicia represent numerical values of weight in pounds, the contents of bag 110 would then weight at least 10 pounds but no more than 15 pounds, since the perforation at 112 has been broken to reveal a "5" imprint 114 and a somewhat smaller perforation 116 has broken to reveal a "10" 120. The smallest perforation in this case, 124, has remained in-tact, however, thus obscuring a weight of "15" shown at 126. As such, the weight of the contents of the receptacle would necessarily be less than 15 pounds but in excess of 10.

Assuming the receptacle is gradually lifted without restriction from a stationary position, the force-releasable elements will provide an accurate reading of the weight of the contents of the receptacle. Under the most controlled circumstances, the accuracy will be limited only by the manufacturing tolerances of the releasable elements or, in some cases, by the geometry and distribution of the contents of the receptacle. However, the manner in which the receptacle is handled and transferred may cause the force-releasable elements to give an inaccurate indication of weight. For example, regardless of where the elements are located relative to the receptacle, if the bag is lifted sufficiently suddenly or rapidly, the momentum of the lift itself may cause one or more of the elements, especially those associated with the lowest weights, to release prematurely. Another problematic situation arises when the bag must be lifted from within another receptacle such as a trash can. In such a situation, the force of friction between the outer surface of the bag and the inner wall of the can may be added to the weight of the receptacle and its contents, which could also lead to a false reading.

Various approaches may be used to address these sources of inaccuracy. The most basic preventative measure involves organizing the elements in increasing order of the weight related to the force required to release the elements, with the strongest element closest to the source of the lifting force. In this way, elements associated with the strongest release force must first be overcome, and, if they remain intact through a potential source of inaccuracy, all elements, including the weaker elements, are likely to be preserved so that they may properly release in accordance with the tensile forces imposed as a result of the weight of the contents of the receptacle. Another approach is to statistically increase the strength of the release force of the elements to account for sudden pulls, friction and other possible sources of inaccuracy. To implement this approach, release elements are tested in conjunction with preferred receptacles under conditions which might present a source of inaccuracy. Based upon data associated with the additional release strength required to render an accurate result, the elements would be strengthened accordingly. By way of example, the release element associated with an india of 5 pounds may be designed to actually release at 5.75 pounds.

Figure 6:
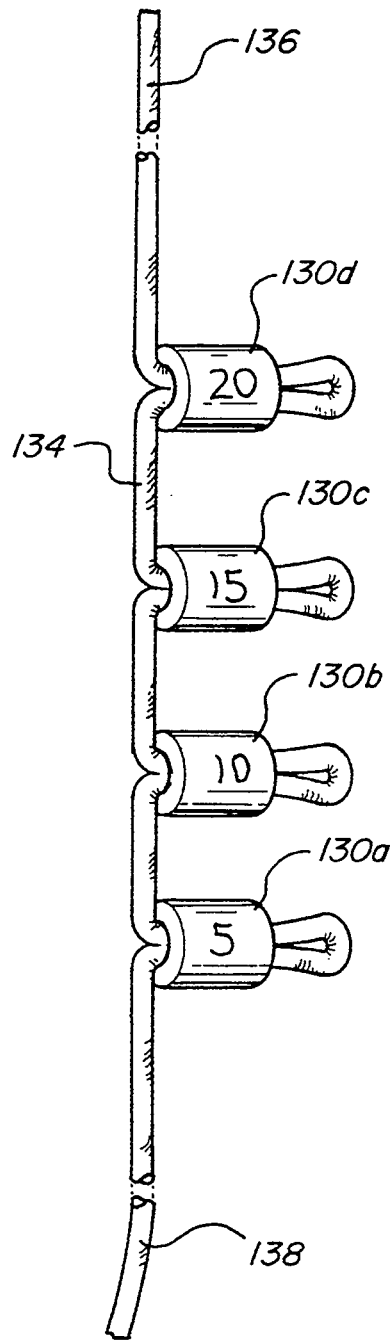
FIG. 6 is a drawing of a cord with force rings used as release elements.

FIG. 6 is a drawing which depicts a further alternative embodiment of a weight indicator in the form of releasable elements 130 placed along a cord 134 which, like the strap just described, is used to lift a receptacle to determine the weight of its contents, the upper portion of the cord 136 being held by a user, and the lower portion 138, which may come attached to the receptacle or which may be tied onto the receptacle as a separate item. Although the force-releasable rings 130 may be in any arrangement according to the weight required for their release, as with other embodiments of the present invention, they are preferably arranged in increasing order with the lowest release force being closest to the bottom. Such an arrangement provides the most accuracy, since, as the elements release and cascade fashion until stopping at the first element requiring more force than the gravitational pull upon the contents of the receptacle can provide, with the lowest releasable member at the bottom, it reduces the likelihood that as the receptacle falls a "false release" will occur by the momentum of the receptacle falling, as opposed to the "dead weight" of its contents. This is true whether the force-releasable elements are in the form of spaced apart band, straps or cords with force rings such as those now being described.

As shown in FIG. 6, there are four rings 130 which release cord 134 in accordance with four weights which are imprinted upon the rings themselves. Various techniques may be used to adjust the force required to release the cord from a ring, such as the diameter of the ring itself, materials placed in the ring or in the loop shown generally at 140 for the ring marked "5." Additionally, the ring may be crimped to provide force alternatives or a rivet may be placed through the ring transverse to the axis of its opening as an alternative means of adjustment. In general, as with all of the embodiments herein described, any release mechanism is suitable and in keeping with the present invention so long as force can be adjusted on a per element basis.

I claim:

1. A weight indicator which may be used to weigh the contents of a receptacle, comprising:
   a length of sheet material disposed so as to experience a tensile force related to the weight of the contents of said receptacle;
   a localized gathering of said material around at least one point along the length of said material;
   a force-releasable element associated with each gathering of said material, the element being operative to hold the gathering together until said tensile force causes the element to release, each element being associated with a different weight; and
   numerical indicia associated with each force-releasable element, whereby a user of said indicator may ascertain the weight of said contents by referring to said indicia in conjunction with which elements have released and which remain intact upon application of said stretching force.

2. The weight indicator of claim 1 wherein said length of flexible material is a top-to-bottom section of the receptacle itself.

3. The weight indicator of claim 2 wherein said gathering is carried out along a band around at least a portion of the girth of said receptacle.

4. The weight indicator of claim 3 wherein said numerical indicia are imprinted upon said gathered material so as to be obscured from view until the element with which it is associated is released.

5. The weight indicator of claim 3 wherein a numerical weight value is imprinted upon a releasable element.

6. The weight indicator of claim 1 wherein said force-releasable element includes a stripe of force-releasable material placed over said localized gathering and attached to hold said gathering intact unless released.

7. The weight indicator of claim 6 wherein the attachment used to hold said gathering is also used as a means of adjusting the force of release.

8. The weight indicator of claim 6 wherein said stripe of force-releasable material uses perforations as a means of adjusting the force required to release it.

9. The weight indicator of claim 6 wherein said stripe of force-releasable material uses thickness as a means of adjusting the force required to release it.

10. The weight indicator of claim 6 wherein varying the composition of said force-releasable material is used as a means of adjusting the force required to release it.

11. The weight indicator of claim 1 wherein said force-releasable element is a tape placed over at least a portion of a gathering, and wherein a weight-related value is printed upon said tape.

12. The weight indicator of claim 1 wherein said length of sheet material is a cord having two ends, one end being adapted for attachment proximate to the top of the receptacle, the other end being available as a means to lift said receptacle, the cord being kinked around at least one point along its length, the kinked portion of the cord being inserted into a ring-like device which acts as a force-release element, the force related to the weight required to pull the cord out of the ring being imprinted upon the outside of the ring in the form of numerical indicia.

13. The weight indicator of claim 12 where said indicia-bearing rings are arranged in order of weight value.

14. The weight indicator of claim 13 wherein crimping of said ring is used as a means of adjusting the force related to the weight required to pull the cord out of the ring.

15. The weight indicator of claim 13 wherein an obstruction is used within said ring as a means of adjusting the force related to the weight required to pull the cord out of the ring.

16. The weight indicator of claim 1 wherein said length of sheet material is a strap having two ends, one end being adapted for attachment proximate to the top of the receptacle, the other end being available as a means to lift said receptacle, said force-releasable elements and accompanying indicia being disposed along the length of said strap.

17. The weight indicator of claim 16 wherein said force-releasable elements are in the form of points along the length of said strap which release the form of breaking.

18. The weight indicator of claim 16 wherein the cross-sectional dimensions of said strap are varied to adjust the weight related to the force required to break a given element.

19. The scale of claim 16 further including an elongated shock-retention member disposed along the length of said strap, the member being attached at points between said force-releasable elements.

20. A scale, comprising:
    a bag to hold contents to be weighed;
    a plurality of weight-related numerical imprints, each imprint being associated with a different numerical value of weight, the imprints extending around at least a portion of the girth of said bag;
    means to obscure said weight-related numerical imprints from view until the weight of said contents substantially equals or exceeds the numerical value of an imprint, at which time those imprints are exposed to provide a user of said scale with an approximation of the weight of said contents.

21. A method of making a bag having an integral weight indicator, comprising the steps of:
    providing a bag of a flexible material;
    gathering the material along at least one band around at least a portion of the girth of said bag such that the bottom of the band is proximate to the top of each band;
    associating a numerical weight value with each gathering, and
    attaching a releasable element over each gathering, the element being adapted to release when the weight of the bag substantially equals or exceeds its associated weight value.

* * * * *